US012706020B2

(12) United States Patent
Kim et al.

(10) Patent No.: US 12,706,020 B2
(45) Date of Patent: Aug. 11, 2026

(54) DISPLAY DEVICE AND METHOD FOR OPERATING SAME

(71) Applicant: LG ELECTRONICS INC., Seoul (KR)

(72) Inventors: Sorin Kim, Seoul (KR); Byungwoo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/170,481

(22) Filed: Apr. 4, 2025

(65) Prior Publication Data

US 2025/0316207 A1 Oct. 9, 2025

(30) Foreign Application Priority Data

Apr. 5, 2024 (KR) ........................ 10-2024-0046899

(51) Int. Cl.
*G09G 3/20* (2006.01)
*G09G 3/3208* (2016.01)

(52) U.S. Cl.
CPC ......... *G09G 3/2096* (2013.01); *G09G 3/3208* (2013.01); *G09G 2320/0633* (2013.01); *G09G 2320/0646* (2013.01); *G09G 2320/103* (2013.01); *G09G 2354/00* (2013.01); *G09G 2370/16* (2013.01)

(58) Field of Classification Search
CPC ........................... G09G 3/2096; G09G 3/3208
USPC .......................................................... 345/204
See application file for complete search history.

(56) References Cited

U.S. PATENT DOCUMENTS 8,427,513 B2 4/2013 Shidara et al.
2009/0174634 A1* 7/2009 Kohno ................ G09G 3/3233 345/84
2018/0122300 A1 5/2018 Jang
2019/0182480 A1* 6/2019 Mao ..................... H04N 19/159
2019/0378457 A1* 12/2019 Shen .................... G09G 3/3258
2020/0143770 A1* 5/2020 Tai ....................... G09G 3/3406
(Continued)

FOREIGN PATENT DOCUMENTS

KR 10-0629587 9/2006
KR 10-2010-0016618 2/2010
(Continued)

OTHER PUBLICATIONS

Korean Intellectual Property Office Application No. 10-2024-0046899, Office Action dated Oct. 28, 2024, 5 pages.
(Continued)

*Primary Examiner* — Calvin C Ma
(74) *Attorney, Agent, or Firm* — LEE, HONG, DEGERMAN, KANG & WAIMEY

(57) ABSTRACT

A display device and a method of operating the same are disclosed. According to at least one of the various embodiments of the present disclosure, a display device includes a display outputting an input image; and a processor controlling the application of a brightness reduction algorithm to the input image, in which the processor, if calculating the difference in Average Picture Level (APL) values for determining whether to apply the brightness reduction algorithm, may determine whether to update the reference frame based on the difference between APL values of the current frame and the reference frame.

14 Claims, 14 Drawing Sheets

(56) References Cited

U.S. PATENT DOCUMENTS

| | | | | |
|---|---|---|---|---|
| 2021/0082344 | A1* | 3/2021 | Hwang | G09G 5/006 |
| 2025/0182690 | A1* | 6/2025 | Seo | G09G 3/3233 |

FOREIGN PATENT DOCUMENTS

| | | |
|---|---|---|
| KR | 10-2011-0045643 | 5/2011 |
| KR | 10-2631190 | 1/2024 |

OTHER PUBLICATIONS

Korean Intellectual Property Office Application No. 10-2024-0046899, Notice of Allowance dated Jun. 12, 2025, 2 pages.

* cited by examiner

FIG. 6
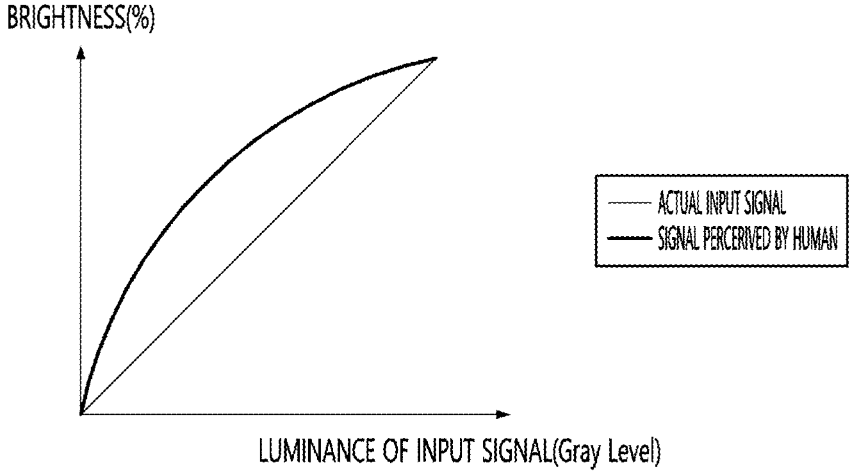
(a)
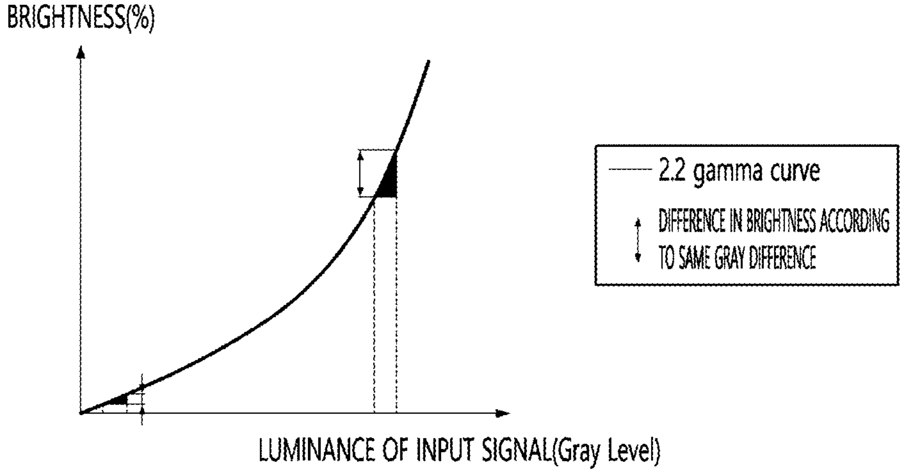
(b)

FIG. 8
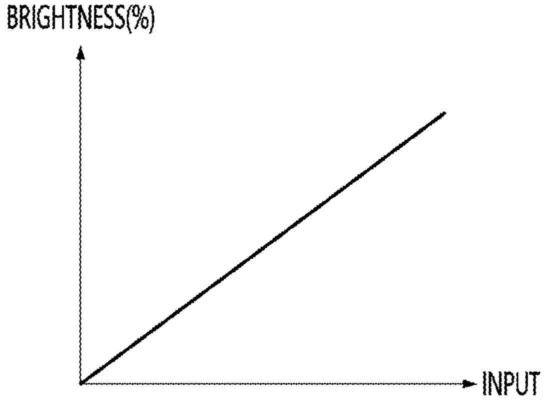
(a)
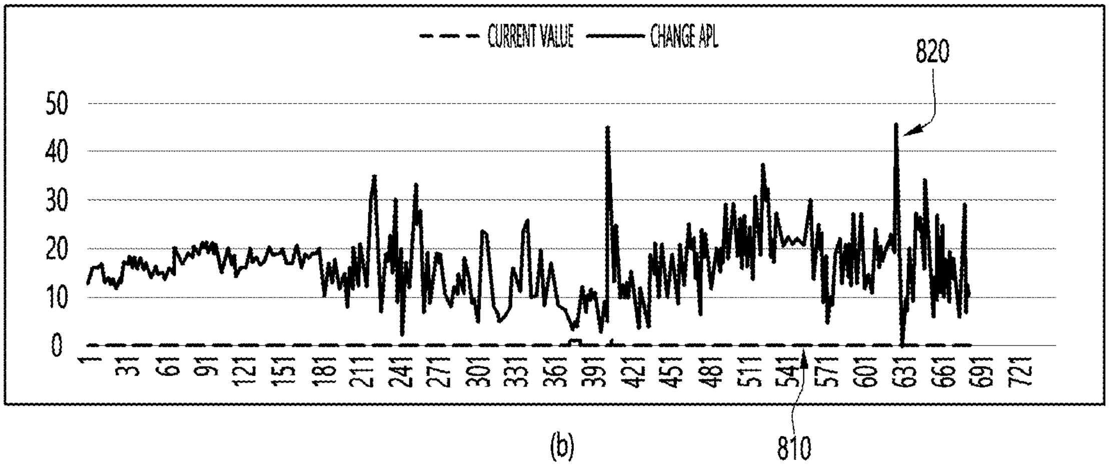
(b)

FIG. 10A

| Frame | CURRENT Frame APL | I CURRENT Frame APL-PREVIOUS Frame APL I | IF APL_THr = THREE DAYS | STORED PREVIOUS Frame APL | FINAL CURRENT Frame APL_PREVIOUS Frame APL I | FINAL BRIGHTNESS REDUCTION DETERMINATION | Case |
|---|---|---|---|---|---|---|---|
| 0 | 14 | - | - | - | - | - | NOT ENTERING case |
| 1 | 14 | 0 | ≤ APL_Thr | 14 | 0 | ≤ APL_Thr | |
| 2 | 14 | 0 | ≤ APL_Thr | 14 | 0 | ≤ APL_Thr | |
| 3 | 14 | 0 | ≤ APL_Thr | 14 | 0 | ≤ APL_Thr | |
| 4 | 13 | 1 | ≤ APL_Thr | 14 | 1 | ≤ APL_Thr | |
| 5 | 13 | 0 | ≤ APL_Thr | 14 | 1 | ≤ APL_Thr | |
| 6 | 14 | 1 | ≤ APL_Thr | 14 | 0 | ≤ APL_Thr | |
| 7 | 17 | 3 | ≤ APL_Thr | 14 | 3 | ≤ APL_Thr | |
| 8 | 18 | 1 | ≤ APL_Thr | 14 | 4 | > NOT ENTERING APL_Thr | |
| 9 | 17 | 1 | ≤ APL_Thr | 14 | 3 | ≤ APL_Thr | |
| 10 | 17 | 0 | ≤ APL_Thr | 14 | 3 | ≤ APL_Thr | |
| 11 | 16 | 1 | ≤ APL_Thr | 14 | 2 | ≤ APL_Thr | |
| 12 | 16 | 0 | ≤ APL_Thr | 14 | 2 | ≤ APL_Thr | |
| 13 | 16 | 0 | ≤ APL_Thr | 14 | 2 | ≤ APL_Thr | |
| 14 | 16 | 0 | ≤ APL_Thr | 14 | 2 | ≤ APL_Thr | |
| 15 | 16 | 0 | ≤ APL_Thr | 14 | 2 | ≤ APL_Thr | |
| 16 | 16 | 0 | ≤ APL_Thr | 14 | 2 | ≤ APL_Thr | |
| 17 | 16 | 0 | ≤ APL_Thr | 14 | 2 | ≤ APL_Thr | |
| 18 | 15 | 1 | ≤ APL_Thr | 14 | 1 | ≤ APL_Thr | |
| 19 | 15 | 0 | ≤ APL_Thr | 14 | 1 | ≤ APL_Thr | |
| 20 | 17 | 2 | ≤ APL_Thr | 14 | 3 | ≤ APL_Thr | |
| 21 | 17 | 0 | ≤ APL_Thr | 14 | 3 | ≤ APL_Thr | |
| 22 | 18 | 1 | ≤ APL_Thr | 14 | 4 | > APL_Thr으로 미진입 | |
| 23 | 18 | 0 | ≤ APL_Thr | 14 | 4 | > APL_Thr으로 미진입 | |
| 24 | 17 | 1 | ≤ APL_Thr | 14 | 3 | ≤ APL_Thr | |
| 25 | 17 | 0 | ≤ APL_Thr | 14 | 3 | ≤ APL_Thr | |

FIG. 10B

| | | | | | | | |
|---|---|---|---|---|---|---|---|
| 26 | 20 | 3 | ≤ APL_Thr | 14 | 6 | > NOT ENTERING APL Thr | NOT ENTERING case |
| 27 | 18 | 2 | ≤ APL_Thr | 14 | 4 | ≤ APL_Thr | |
| 28 | 18 | 0 | ≤ APL_Thr | 14 | 4 | ≤ APL_Thr | |
| 29 | 19 | 1 | ≤ APL_Thr | 14 | 5 | ≤ APL_Thr | |
| 30 | 19 | 0 | ≤ APL_Thr | 14 | - | - | |
| 31 | 23 | 4 | > APL_Thr | 23 | 0 | STILL IMAGE DETERMINATION TIME 0 reset | STILL IMAGE DETERMINATION TIME reset case |
| 32 | 22 | 1 | ≤ APL_Thr | 23 | 1 | ≤ APL_Thr | ENTRY case |
| 33 | 21 | 1 | ≤ APL_Thr | 23 | 2 | ≤ APL_Thr | |
| 34 | 21 | 0 | ≤ APL_Thr | 23 | 2 | ≤ APL_Thr | |
| 35 | 22 | 1 | ≤ APL_Thr | 23 | 1 | ≤ APL_Thr | |
| 36 | 21 | 1 | ≤ APL_Thr | 23 | 2 | ≤ APL_Thr | |
| 37 | 21 | 0 | ≤ APL_Thr | 23 | 2 | ≤ APL_Thr | |
| 38 | 20 | 1 | ≤ APL_Thr | 23 | 3 | ≤ APL_Thr | |
| 39 | 21 | 1 | ≤ APL_Thr | 23 | 2 | ≤ APL_Thr | |
| ... | | | | | | | |
| 14369 | 20 | 20 | ≤ APL_Thr | 23 | 3 | ≤ APL_Thr | |
| 14370 | 20 | 0 | ≤ APL_Thr | 23 | 3 | DETERMINATED STILL IMAGE, BRIGHTNESS REDUCTION ENTERED | |
| 14371 | 23 | 3 | ≤ APL_Thr | 23 | 0 | ≤ APL_Thr | RESTORE case |
| 14372 | 24 | 1 | ≤ APL_Thr | 23 | 1 | ≤ APL_Thr | |
| 14373 | 28 | 4 | > APL_Thr | 23 | 5 | > RESTORE BRIGHTNESS TO APL_Thr | |

FIG. 13

(a)

| Frame | CURRENT Frame APL | FIRST FINAL BRIGHTNESS REDUCTION DETERMINATION | SECOND FINAL BRIGHTNESS REDUCTION DETERMINATION |
|---|---|---|---|
| 0 | 0 | - | - |
| 1 | 0 | ≤ APL_Thr | ≤ APL_Thr |
| 2 | 0 | ≤ APL_Thr | ≤ APL_Thr |
| 3 | 0 | ≤ APL_Thr | ≤ APL_Thr |
| 4 | 0 | ≤ APL_Thr | ≤ APL_Thr |
| 5 | 0 | ≤ APL_Thr | ≤ APL_Thr |
| 6 | 0 | ≤ APL_Thr | ≤ APL_Thr |
| 7 | 0 | ≤ APL_Thr | ≤ APL_Thr |
| 8 | 0 | ≤ APL_Thr | ≤ APL_Thr |
| ... | | | |
| 14400 | 1 | ≤ APL_Thr | ≤ APL_Thr |
| 14401 | 1 | ≤ APL_Thr | ≤ APL_Thr |
| 14402 | 2 | ≤ APL_Thr | ≤ APL_Thr |
| 14403 | 2 | ≤ APL_Thr | ≤ APL_Thr |
| 14404 | 3 | ≤ APL_Thr | ≤ APL_Thr |
| 14405 | 3 | ≤ APL_Thr | ≤ APL_Thr |
| 14406 | 4 | ≤ APL_Thr | ≤ APL_Thr |
| 14407 | 4 | ≤ APL_Thr | > APL_Thr |
| | | MAINTAIN SCREEN DARK | BRIGHTEN SCREEN |

(b)

DISPLAY DEVICE AND METHOD FOR OPERATING SAME

CROSS-REFERENCE TO RELATED APPLICATION

Pursuant to 35 U.S.C. § 119(a), this application claims the benefit of earlier filing date and right of priority to Korean Patent Application No. 10-2024-0046899, filed on Apr. 5, 2024, the contents of which are hereby incorporated by reference herein in its entirety.

BACKGROUND

The present disclosure relates to a display device and a method of operating the same.

Recently, the functions of terminals have become more diverse, for example, data and voice communication, taking pictures and videos through a camera, recording voice, playing music files through a speaker system or the like, and outputting images or videos on a display.

Some terminals have added electronic game play capabilities or perform multimedia player functions.

As terminals become more diverse in their functions, they are being implemented in the form of multimedia players with complex functions, such as taking pictures or moving images, playing music or moving image files, playing games, and receiving broadcasts.

SUMMARY

An object of the present disclosure is to provide a display device which provides an improved brightness reduction algorithm for preventing afterimages of a display panel, and a method for operating the same.

Another object of the present disclosure is to provide a display device which determines whether a still image is in a dark-gradation image, and a method for operating the same.

According to at least one of the various embodiments of the present disclosure, a display device includes a display outputting an input image; and a processor controlling the application of a brightness reduction algorithm to the input image, in which the processor, if calculating the difference in Average Picture Level (APL) values for determining whether to apply the brightness reduction algorithm, may determine whether to update the reference frame based on the difference between APL values of the current frame and the reference frame.

At this time, the control part, if the difference between the APL values of the current frame and the reference frame is equal to or less than a preset threshold, may not update the reference frame but fixes the reference frame and use the reference frame as a reference frame for the next frame after the current frame.

In addition, the control part, if the difference between the APL values of the current frame and the reference frame exceeds a preset threshold, may control to update the reference frame to the current frame so that the current frame is used as the reference frame.

In addition, the control part, if the reference frame is fixed, may increase a still image determination time count.

In addition, the control part, if the still image determination time count is increased, may determine whether the still image determination reference time is exceeded.

In addition, the control part, if determining that the still image determination reference time is exceeded, may determine the image as a still image.

In addition, the control part, if determining the image as a still image, may control the brightness reduction algorithm to be applied.

In addition, the control part, if the brightness reduction algorithm is applied, may control the brightness to be reduced linearly at a predetermined slope until the target brightness is reached.

In addition, the control part, if determining that the still image determination reference time is not exceeded, may determine the image as a moving image.

In addition, the control part, if determining the image as the moving image, may control not to apply the brightness reduction algorithm.

In addition, the control part may calculate the difference in APL values for determining whether to apply the brightness reduction algorithm to the next frame of the current frame as the reference frame after determining the still image or moving image.

In addition, the control part, if the current frame is updated to the reference frame, may reset the counted still image determination time count.

In addition, the control part may determine whether the image is a still image by comparing the APL value of the current frame updated with the reference frame and the APL value of the next frame after the current frame.

According to at least one of the various embodiments of the present disclosure,

First, there is an advantage in reducing afterimages on the display panel or lowering the risk of afterimages.

Second, there is an advantage in that it can improve user viewing satisfaction by preventing the screen from getting darker additionally even when it is not a still image in a dark-gradation image.

BRIEF DESCRIPTION OF THE DRAWINGS

FIG. 6 is a graph illustrating the brightness reduction algorithm.

FIG. 8 is a graph illustrating changes in output APL according to input gradation according to one embodiment of the present disclosure and changes in input APL detection location in the same low-gradation image.

FIGS. 10*a* and 10*b* are views illustrating examples of APL calculation according to an input frame according to an embodiment of the present disclosure.

FIG. 13 is a view illustrating a luminance processing method according to an input APL according to an embodiment of the present disclosure.

DETAILED DESCRIPTION OF THE EMBODIMENTS

Hereinafter, embodiments related to the present disclosure will be described in more detail with reference to the drawings. The suffixes "module" and "part" used for components in the following description are given or used interchangeably only for the convenience of writing the specification, and do not have distinct meanings or roles in themselves.

Figure 1:
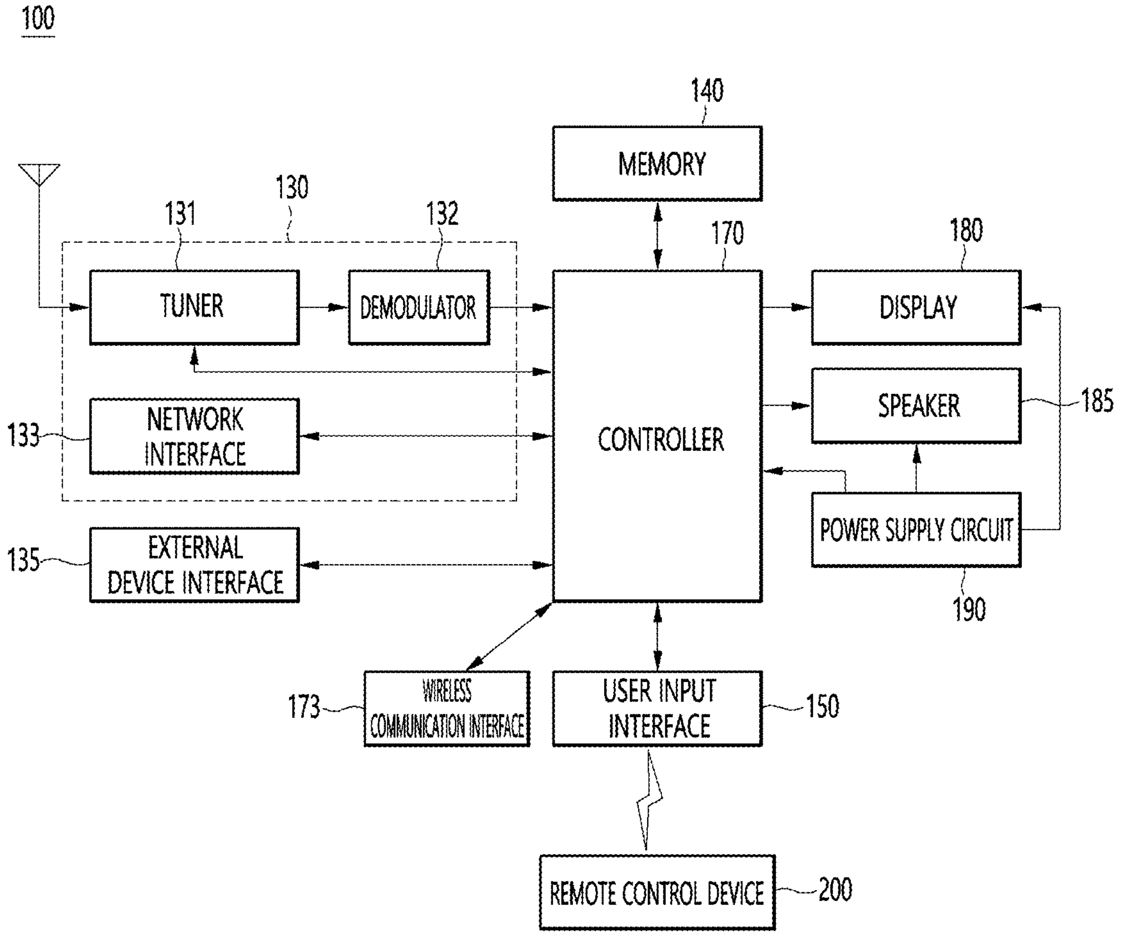
FIG. 1 is a block diagram illustrating the configuration of a display device according to an embodiment of the present disclosure.

FIG. 1 is a block diagram illustrating the configuration of a display device 100 according to an embodiment of the present disclosure.

Referring to FIG. 1, the display device 100 may include a broadcast receiving part 130, an external device interface part 135, a storage part 140, a user input interface part 150, a control part 170, a wireless communication interface part 173, a voice acquisition part 175, a display part 180, an audio output part 185, and a power supply part 190.

The broadcast receiving part 130 may include a tuner 131, a demodulator 132, and a network interface part 133.

The tuner 131 can select a specific broadcast channel according to a channel selection command. The tuner 131 can receive a broadcast signal for the selected specific broadcast channel.

The demodulator 132 can separate the received broadcast signal into a video signal, an audio signal, and a data signal related to the broadcast program, and can restore the separated video signal, audio signal, and data signal into a form that can be output.

The network interface part 133 can provide an interface for connecting the display device 100 to a wired/wireless network including the Internet. The network interface part 133 can transmit or receive data with other users or other electronic devices through the accessed network or another network linked to the accessed network.

The network interface part 133 can access a predetermined web page through an accessed network or another network linked to the accessed network. In other words, it can access a predetermined web page through a network and transmit or receive data with the corresponding server.

In addition, the network interface part 133 can receive content or data provided by a content provider or a network operator. In other words, the network interface part 133 can receive content such as movies, advertisements, games, VOD (Video on Demand), broadcast signals, or the like, and information related thereto provided from a content provider or a network provider through a network.

In addition, the network interface part 133 can receive firmware update information and update files provided by the network operator, and transmit data to the Internet or content provider or network operator.

The network interface part 133 can select and receive a desired application from among applications open to the public via a network.

The external device interface part 135 can receive an application or a list of applications in an adjacent external device and transmit it to the control part 170 or storage part 140.

The external device interface part 135 can provide a connection path between the display device 100 and the external device. The external device interface part 135 can receive one or more of images and audio output from an external device connected wirelessly or wiredly to the display device 100 and transmit them to the control part 170. The external device interface part 135 can include a plurality of external input terminals. The plurality of external input terminals can include an RGB terminal, one or more HDMI (High Definition Multimedia Interface) terminals, and a component terminal.

The voice signal of an external device input through the external device interface part 135 can be output through the display part 180. The voice signal of an external device input through the external device interface part 135 can be output through the audio output part 185.

An external device that can be connected to the external device interface part 135 may be any one of a set-top box, a Blu-ray player, a DVD player, a game console, a sound bar, a smartphone, a PC, a USB memory, and a home theater, but this is only an example.

In addition, some of the content data stored in the display device 100 can be transmitted to a selected user or electronic device among other users or other electronic devices pre-registered in the display device 100.

The storage part 140 stores programs for each signal processing and control within the control part 170 and can store signal-processed images, voices, or data signals.

In addition, the storage part 140 may perform a function for temporary storage of image, voice, or data signals input from an external device interface part 135 or a network interface part 133, and may also store information about a specific image through a channel memory function.

The storage part 140 can store an application or a list of applications input from an external device interface part 135 or a network interface part 133.

The display device 100 can play content files (moving image files, still image files, music files, document files, application files, or the like) stored in the storage part 140 and provide them to the user.

The user input interface part 150 can transmit a signal input by a user to the control part 170, or transmit a signal from the control part 170 to the user. For example, the user input interface part 150 can receive and process control signals such as power on/off, channel selection, and screen setting from the remote control device 200 according to various communication methods such as Bluetooth, Ultra Wideband (UWB), ZigBee, RF (Radio Frequency) communication, or infrared (IR) communication, or process the control signals from the control part 170 to be transmitted to the remote control device 200.

In addition, the user input interface part 150 can transmit control signals input from local keys (not illustrated) such as a power key, channel key, volume key, and setting key to the control part 170.

An image signal processed in the control part 170 may be input to the display part 180 and displayed as an image corresponding to the image signal. In addition, an image signal processed in the control part 170 may be input to an external output device through the external device interface part 135.

The voice signal processed in the control part 170 can be output as audio to the audio output part 185. In addition, the voice signal processed in the control part 170 can be input to an external output device through the external device interface part 135.

In addition, the control part 170 can control the overall operation within the display device 100.

In addition, the control part 170 can control the display device 100 by a user command or internal program input through the user input interface part 150, and can access to a network to allow the user to download a desired application or application list into the display device 100.

The control part 170 enables the channel information or the like selected by the user to be output through the display part 180 or audio output part 185 together with the processed image or voice signal.

In addition, the control part 170 enables an image signal or voice signal from an external device, for example, a camera or camcorder, input through the external device interface part 135 to be output through the display part 180 or audio output part 185 according to an external device image playback command received through the user input interface part 150.

Meanwhile, the control part 170 can control the display part 180 to display an image, and for example, can control the display part 180 to display a broadcast image input through the tuner 131, an external input image input through the external device interface part 135, an image input through the network interface part, or an image stored in the storage part 140. In this case, the image displayed on the display part 180 can be a still image or a moving image, and can be a 2D image or a 3D image.

In addition, the control part 170 can control the playback of content stored in the display device 100, received broadcast content, or external input content input from outside, and the content can be in various forms such as broadcast images, external input images, audio files, still images, connected web screens, document files, or the like.

The wireless communication part 173 can perform communication with an external device through wired or wireless communication. The wireless communication part 173 can perform short range communication with an external device. To this end, the wireless communication part 173 may support short-range communication using at least one of Bluetooth (Bluetooth™ BLE (Bluetooth Low Energy)), RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus) technologies. The wireless communication part 173 may support wireless communication between the display device 100 and a wireless communication system, between the display device 100 and another display device 100, or between the display device 100 and a network where the display device 100 (or an external server) is located through short-range wireless communication networks (Wireless Area Networks). The short-range wireless communication networks may be short-range wireless personal area networks.

Here, the other display device 100 may be a wearable device (for example, a mobile terminal such as a smart watch, smart glass, a head mounted display (HMD), and a smart phone) that can exchange data with the display device 100 according to the present disclosure (or can be linked). The wireless communication part 173 may detect (or recognize) a wearable device capable of communication around the display device 100. Furthermore, if the detected wearable device is an authenticated device to communicate with the display device 100 according to the present disclosure, the control part 170 may transmit at least a part of the data processed in the display device 100 to the wearable device through the wireless communication part 173. Accordingly, a user of the wearable device may use the data processed in the display device 100 through the wearable device.

The voice acquisition part 175 can acquire audio. The voice acquisition part 175 can include at least one microphone (not illustrated) and can acquire audio around the display device 100 through the microphone (not illustrated).

The display part 180 can generate a driving signal by converting an image signal, data signal, OSD signal processed by the control part 170 or an image signal, data signal, or the like received from the external device interface part 135 into R, G, B signals, respectively.

Meanwhile, since the display device 100 illustrated in FIG. 1 is only an embodiment of the present disclosure, some of the illustrated components may be integrated, added, or omitted according to the specifications of the display device 100 actually implemented.

In other words, two or more components may be combined into one component, or one component may be subdivided into two or more components, as needed. In addition, the functions performed by each block are intended to explain the embodiments of the present disclosure, and the specific operations or devices thereof do not limit the scope of the present disclosure.

According to another embodiment of the present disclosure, unlike as illustrated in FIG. 1, the display device 100 may receive and play back an image through a network interface part 133 or an external device interface part 135 without having a tuner 131 and a demodulator 132.

For example, the display device 100 may be implemented separately as an image processing device, such as a set-top box for receiving contents according to broadcast signals or various network services, and a content playback device for playing contents input from the image processing device.

In this case, the operation method of the display device according to the embodiment of the present disclosure to be described below may be performed by any one of the display device 100 described with reference to FIG. 1, as well as an image processing device such as a separate set-top box, or a content playback device having a display part 180 and an audio output part 185.

The audio output part 185 receives a voice-processed signal by the control part 170 and outputs it as voice.

The power supply part 190 supplies power to the entire display device 100. In particular, it can supply power to a control part 170 that can be implemented in the form of a system on chip (SOC), a display part 180 for displaying images, an audio output part 185 for outputting audio, or the like.

Specifically, the power supply part 190 may be equipped with a converter that converts AC power into DC power and a dc/dc converter that converts the level of the DC power.

Next, a remote control device according to an embodiment of the present disclosure will be described with reference to FIGS. 2 and 3.

Figure 2:
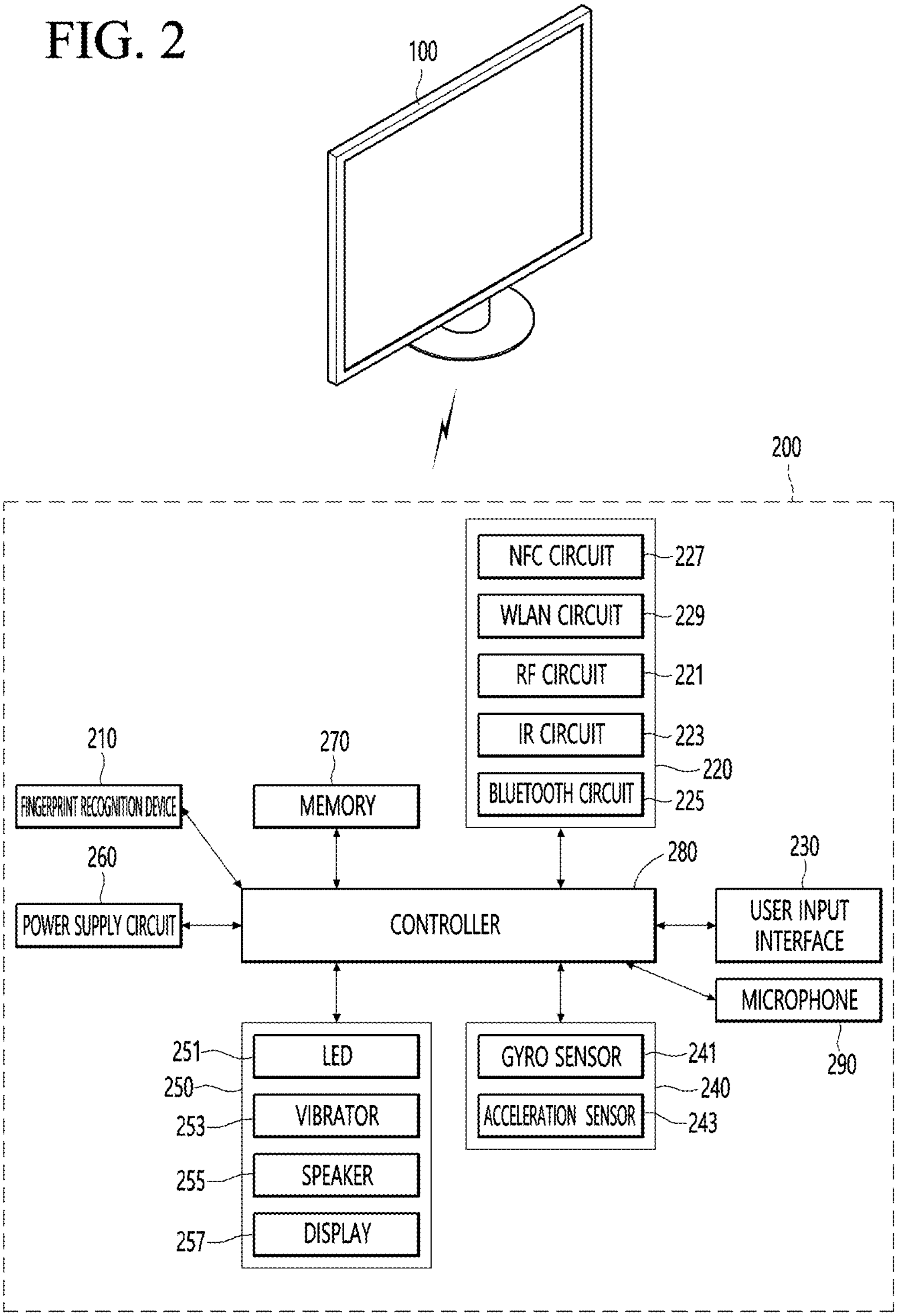
FIG. 2 is a block diagram illustrating the configuration of a remote control device according to an embodiment of the present disclosure.
Figure 3:
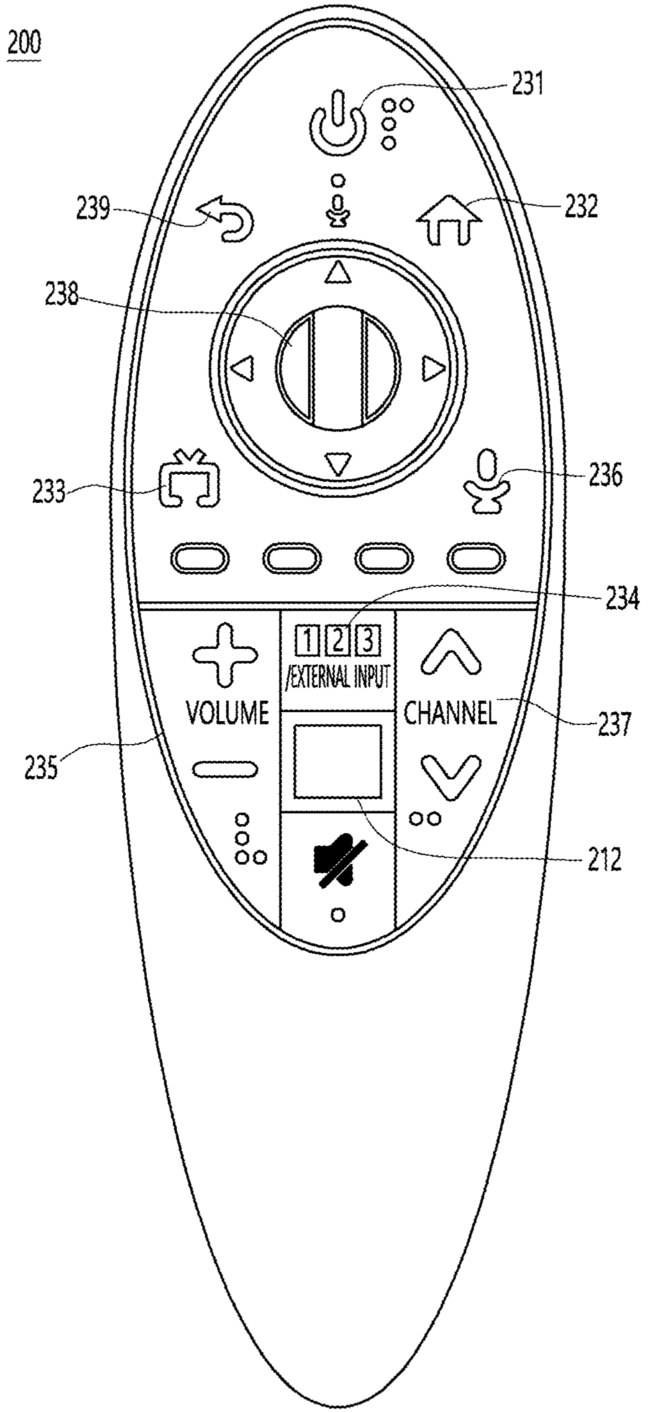
FIG. 3 illustrates an example of an actual configuration of a remote control device according to an embodiment of the present disclosure.

FIG. 2 is a block diagram illustrating a remote control device according to an embodiment of the present disclosure, and FIG. 3 illustrates an example of an actual configuration of a remote control device according to an embodiment of the present disclosure.

First, referring to FIG. 2, the remote control device 200 may include a fingerprint recognition part 210, a wireless communication part 220, a user input part 230, a sensor part 240, an output part 250, a power supply part 260, a storage part 270, a control part 280, and a voice acquisition part 290.

Referring to FIG. 2, the wireless communication part 220 transmits and receives signals with any one of the display devices according to the embodiments of the present disclosure described above.

The remote control device 200 may be equipped with an RF module 221 capable of transmitting and receiving signals with the display device 100 in accordance with RF communication standards, and may be equipped with an IR module 223 capable of transmitting and receiving signals with the display device 100 in accordance with IR communication standards. In addition, the remote control device 200 may be equipped with a Bluetooth module 225 capable of transmitting and receiving signals with the display device 100 in accordance with Bluetooth communication standards. In addition, the remote control device 200 may be equipped with an NFC module 227 capable of transmitting and receiving signals with the display device 100 in accordance with NFC (Near Field Communication) communication standards, and may be equipped with a WLAN module 229 capable of transmitting and receiving signals with the display device 100 in accordance with WLAN (Wireless LAN) communication standards.

In addition, the remote control device 200 transmits a signal containing information about the movement of the remote control device 200 to the display device 100 through the wireless communication part 220.

Meanwhile, the remote control device 200 can receive a signal transmitted by the display device 100 through the RF module 221, and, if necessary, can transmit commands for turning the power on/off, changing the channel, changing the volume, or the like to the display device 100 through the IR module 223.

The user input part 230 may be composed of a keypad, a button, a touch pad, a touch screen, or the like. The user may input a command related to the display device 100 to the remote control device 200 by operating the user input part 230. If the user input part 230 is provided with a hard key button, the user may input a command related to the display device 100 to the remote control device 200 by pushing the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a confirmation button 238, and a back button 239.

The fingerprint recognition button 212 may be a button for recognizing a user's fingerprint. In one embodiment, the fingerprint recognition button 212 may be capable of a push operation, and thus may receive a push operation and a fingerprint recognition operation. The power button 231 may be a button for turning the display device 100 on/off. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the volume output by the display device 100. The voice recognition button 236 may be a button for receiving a user's voice and recognizing the received voice. The channel change button 237 may be a button for receiving a broadcast signal of a specific broadcast channel. The confirmation button 238 may be a button for selecting a specific function, and the back button 239 may be a button for returning to the previous screen.

FIG. 2 will be explained again.

When the user input part 230 is equipped with a touch screen, the user can input a command related to the display device 100 using the remote control device 200 by touching a soft key of the touch screen. In addition, the user input part 230 may be equipped with various types of input devices that can be operated by the user, such as a scroll key, a jog key, or the like, and this embodiment does not limit the scope of the rights of the present disclosure.

The sensor part 240 may be equipped with a gyro sensor 241 or an acceleration sensor 243, and the gyro sensor 241 may sense information about the movement of the remote control device 200.

For example, the gyro sensor 241 can sense information about the operation of the remote control device 200 based on the x, y, and z axes, and the acceleration sensor 243 can sense information about the movement speed of the remote control device 200. Meanwhile, the remote control device 200 can further be equipped with a distance measuring sensor, so as to sense the distance to the display part 180 of the display device 100.

The output part 250 can output an image or voice signal corresponding to the manipulation of the user input part 230 or to a signal transmitted from the display device 100. Through the output part 250, the user can recognize whether the user input part 230 is being manipulated or whether the display device 100 is being controlled.

For example, the output part 250 may be equipped with an LED module 251 that lights up, a vibration module 253 that generates vibrations, an audio output module 255 that outputs audio, or a display module 257 that outputs an image when the user input part 230 is manipulated or a signal is transmitted and received with the display device 100 through the wireless communication part 220.

In addition, the power supply part 260 supplies power to the remote control device 200, and power waste can be reduced by stopping the power supply when the remote control device 200 does not move for a predetermined period of time. The power supply part 260 can resume the power supply when a predetermined key provided in the remote control device 200 is manipulated.

The storage part 270 can store various types of programs, application data, or the like required for the control or operation of the remote control device 200. If the remote control device 200 wirelessly transmits and receives signals through the display device 100 and the RF module 221, the remote control device 200 and the display device 100 transmit and receive signals through a predetermined frequency band.

The control part 280 of the remote control device 200 can store and reference information about the frequency band or the like that can wirelessly transmit and receive signals with the display device 100 paired with the remote control device 200, in the storage part 270.

The control part 280 controls all matters related to the control of the remote control device 200. The control part 280 can transmit a signal corresponding to a predetermined key manipulation of the user input part 230 or a signal corresponding to the movement of the remote control device 200 sensed by the sensor part 240 to the display device 100 through the wireless communication part 220.

Additionally, the voice acquisition part 290 of the remote control device 200 can acquire voice.

The voice acquisition part 290 may include at least one microphone 291 and may acquire voice through the microphone 291.

Figure 4:
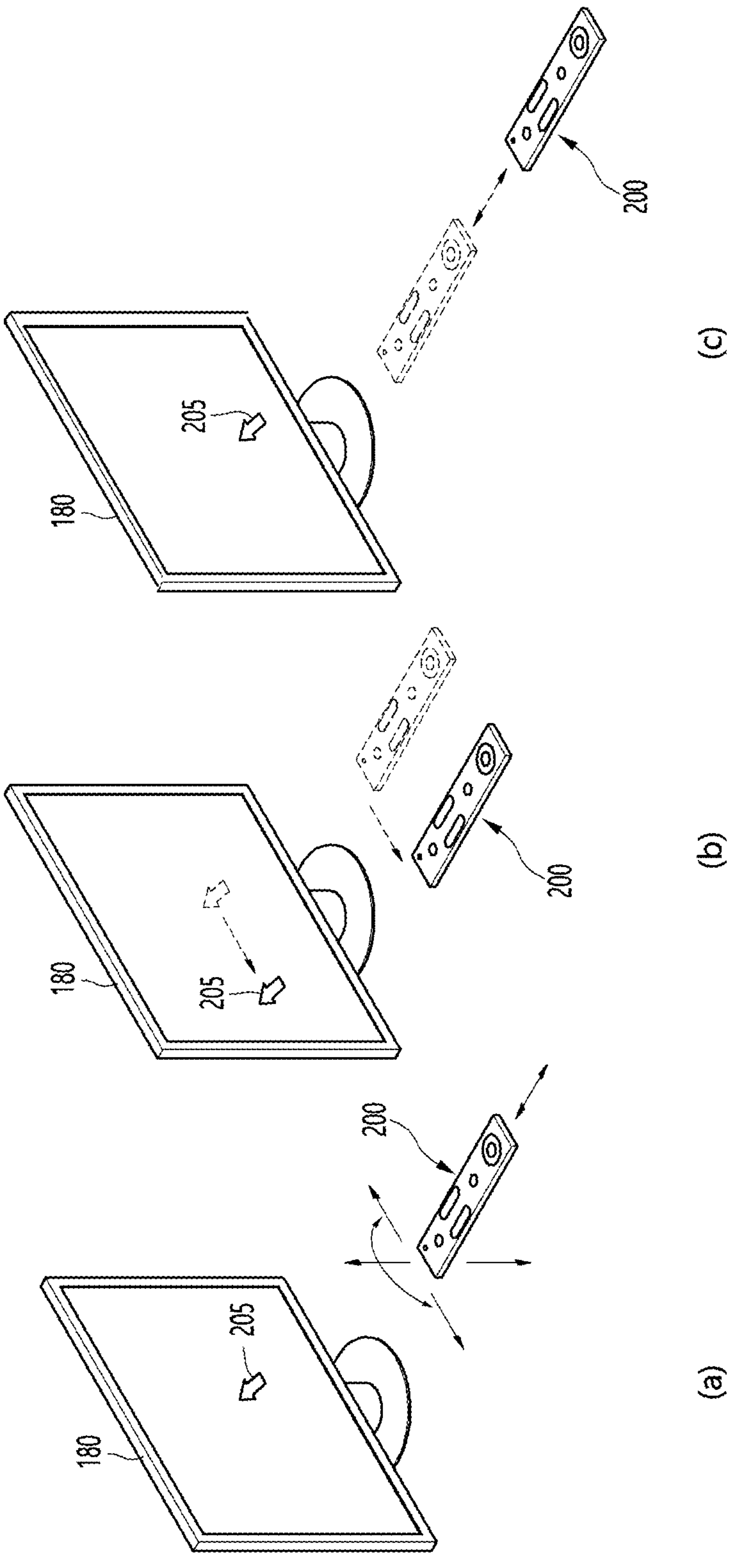
FIG. 4 illustrates an example of utilizing a remote control device according to an embodiment of the present disclosure.

Next, FIG. 4 is described.

FIG. 4 illustrates an example of utilizing a remote control device according to an embodiment of the present disclosure.

FIG. 4(*a*) illustrates that a pointer 205 corresponding to a remote control device 200 is displayed on a display part 180.

The user can move the remote control device 200 up and down, left and right, or rotate it.

The pointer 205 displayed on the display part 180 of the display device 100 corresponds to the movement of the remote control device 200. As illustrated in the drawing, the pointer 205 of this remote control device 200 moves and is displayed according to the movement in 3D space, so it can be called a space remote control.

FIG. 4(*b*) exemplifies that when a user moves the remote control device 200 to the left, the pointer 205 displayed on the display part 180 of the display device 100 also moves to the left according to this.

Information about the movement of the remote control device 200 detected through the sensor of the remote control device 200 is transmitted to the display device 100. The display device 100 can calculate the coordinates of the pointer 205 from the information about the movement of the remote control device 200. The display device 100 can display the pointer 205 to correspond to the calculated coordinates.

FIG. 4(*c*) illustrates a case where a user moves the remote control device 200 away from the display part 180 while pressing a specific button within the remote control device 200. As a result, a selection area within the display part 180 corresponding to the pointer 205 can be zoomed in and displayed in an enlarged manner.

Conversely, when the user moves the remote control device 200 closer to the display part 180, the selection area within the display part 180 corresponding to the pointer 205 may be zoomed out and displayed in a reduced size.

Meanwhile, when the remote control device 200 moves away from the display part 180, the selection area may be zoomed out, and when the remote control device 200 moves closer to the display part 180, the selection area may be zoomed in.

In addition, when a specific button in the remote control device 200 is pressed, recognition of up, down, left, and right movements can be excluded. In other words, when the remote control device 200 moves away from or toward the display part 180, up, down, left, and right movements are not recognized, and only forward and backward movements can be recognized. When a specific button in the remote control device 200 is not pressed, only the pointer 205 moves according to the up, down, left, and right movements of the remote control device 200.

Meanwhile, the movement speed or movement direction of the pointer 205 can correspond to the movement speed or movement direction of the remote control device 200.

Meanwhile, the pointer in this specification means an object displayed on the display part 180 in response to the operation of the remote control device 200. Accordingly, objects of various shapes other than the arrow shape illustrated in the drawing may be used as the pointer 205. For example, the pointer may be a concept including a point, a cursor, a prompt, a thick outline, or the like. In addition, the pointer 205 may be displayed corresponding to one point of the horizontal and vertical axes on the display part 180, and may also be displayed corresponding to multiple points such as lines and surfaces.

Figure 5:
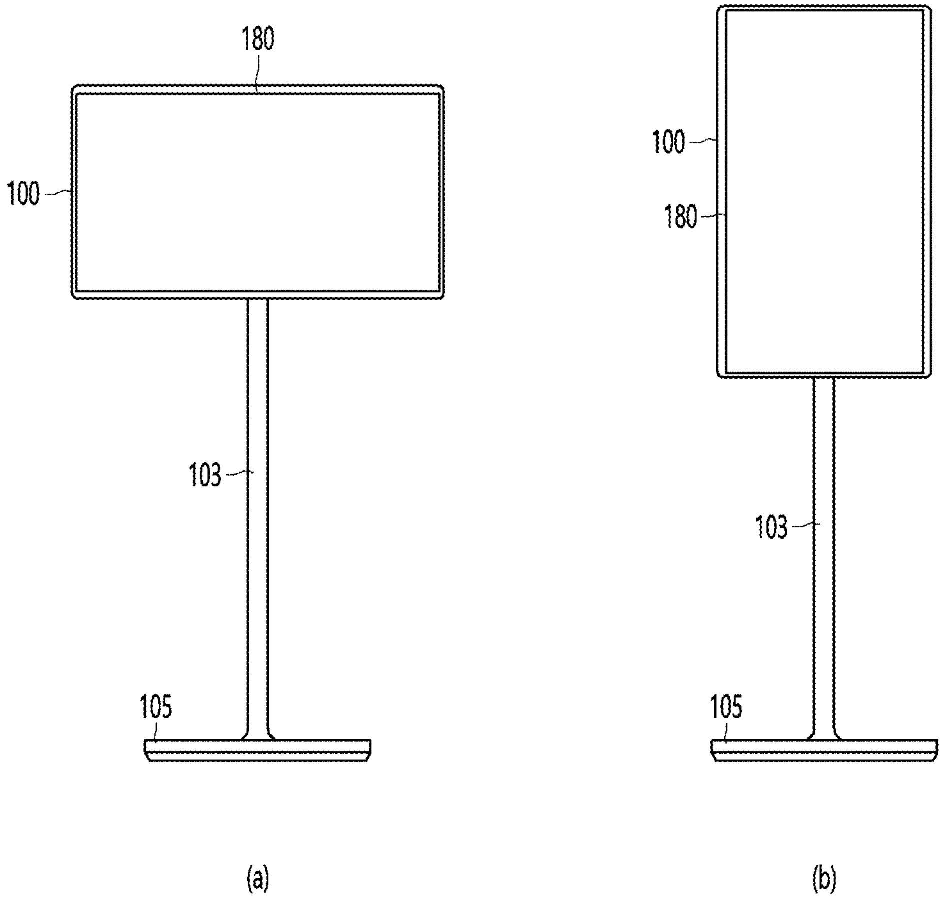
FIG. 5 is a view for explaining the horizontal mode and vertical mode of a stand-type display device according to an embodiment of the present disclosure.

FIG. 5(*a*) and FIG. 5(*b*) are views for explaining the horizontal mode and vertical mode of a stand-type display device according to an embodiment of the present disclosure.

Referring to FIG. 5(*a*) and FIG. 5(*b*), a stand-type display device 100 is illustrated.

A shaft 103 and a stand base 105 can be connected to the display device 100.

The shaft 103 can connect the display device 100 and the stand base 105. The shaft 103 can extend vertically.

The lower end of the shaft 103 can be connected to the edge of the stand base 105.

The lower end of the shaft 103 can be rotatably connected to the perimeter of the stand base 105.

The display device 100 and shaft 103 can rotate around a vertical axis with respect to the stand base 105.

The upper part of the shaft 103 can be connected to the rear surface of the display device 100.

The stand base 105 can serve to support the display device 100.

The display device 100 may be configured to include a shaft 103 and a stand base 105.

The display device 100 can rotate around the point where the upper part of the shaft 103 and the rear surface of the display 180 meet.

FIG. 5(*a*) may illustrate that the display 180 operates in a horizontal mode in which the horizontal length is greater than the vertical length, and FIG. 5(*b*) may illustrate that the display 180 operates in a horizontal mode in which the vertical length is greater than the horizontal length.

The user can move the stand-type display device 100. In other words, unlike a fixed device, the stand-type display device 100 has improved mobility, so the user is not restricted by the disposition location.

FIG. 6 is a graph illustrating the brightness reduction algorithm.

FIG. 6(*a*) is a graph illustrating the change in luminance perceived by a person according to the input signal, and FIG. 6(*b*) illustrates a gamma curve.

Referring to FIG. 6(*a*), the horizontal axis may represent the luminance (gray level) of the input signal, and the vertical axis may represent the brightness (%).

Referring to FIG. 6(*a*), even if the actual input signal is linear, the human eye cannot perceive luminance linearly.

In other words, people are good at perceiving changes in luminance in dark areas, but not so good at perceiving changes in luminance in bright areas. For this reason, a gamma curve such as that in FIG. 6(*b*) is applied.

Among the gamma curves, the most commonly used is the NTSC (National Television System Committee) standard gamma value of 2.2, as illustrated in FIG. 6(*b*).

Here, gamma refers to the relationship (slope) between the light output or luminance Y on the monitor according to the video input signal X.

Therefore, to compensate for this, the display adjusts the gamma value to be optimized for the human eye so that people perceive the signal linearly.

The present disclosure discloses a display device employing an OLED panel as a display panel, for example, and a method for operating the same. However, the present disclosure is not limited to the OLED panel.

A display device 100 employing an OLED panel may have a brightness reduction algorithm applied to prevent afterimages due to the characteristics of the OLED panel.

Such a brightness reduction algorithm reduces the overall brightness for a still image, for example. At this time, the brightness reduction algorithm can detect and utilize the APL (Average Pixel Level) value.

Specifically, the brightness reduction algorithm can calculate the APL value of the final screen for each frame.

For example, if the APL difference between the previous frame and the current frame is equal to or less than a preset threshold, the display device 100 can determine that it is a still screen.

If it is determined to be a still screen, the display device 100 can operate to reduce the brightness of the screen.

The existing brightness reduction algorithm in a still image calculates the APL value in a block where gamma adjustment has been completed, as illustrated in FIG. 6(*b*).

Referring to FIG. 6(*b*), it can be seen that in relatively low-gradation images, the difference in APL values is smaller than in high-gradation images even when there is a change of the same level. In other words, it is difficult to obtain the difference in APL values by frame in images with dark-gradation.

In other words, in a dark-gradation moving image where the final APL value is, for example, '0', the difference in the maximum APL values may be '0'. In this case, even if it is a dark-gradation moving image, it may be determined as a still image despite being a moving image, that is, the screen brightness reduction algorithm may be activated.

Therefore, the dark screen becomes even darker, which may cause discomfort to the user's viewing.

To improve this, the present disclosure provides an improved brightness reduction algorithm. The improved brightness reduction algorithm utilizes APL values, but uses a different algorithm than the conventional one, that is, the location where the APL values are calculated can be changed.

Through this, according to the present disclosure, it is possible to accurately determine movement even in a dark-gradation image, thereby controlling the operation of a brightness reduction algorithm.

Figure 7:
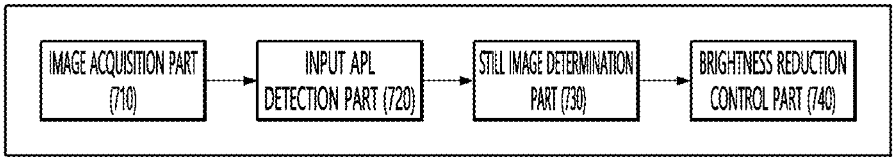
FIG. 7 is a schematic diagram illustrating a brightness processing part according to an embodiment of the present disclosure.

FIG. 7 is a block diagram illustrating a brightness reduction operation control configuration according to an embodiment of the present disclosure.

FIG. 8(*a*) is a graph illustrated to explain an output APL value according to an input gradation according to an embodiment of the present disclosure, and FIG. 8(*b*) is a graph illustrated to explain a change according to a change in an input APL value detection location in the same low-gradation image.

Figure 9:
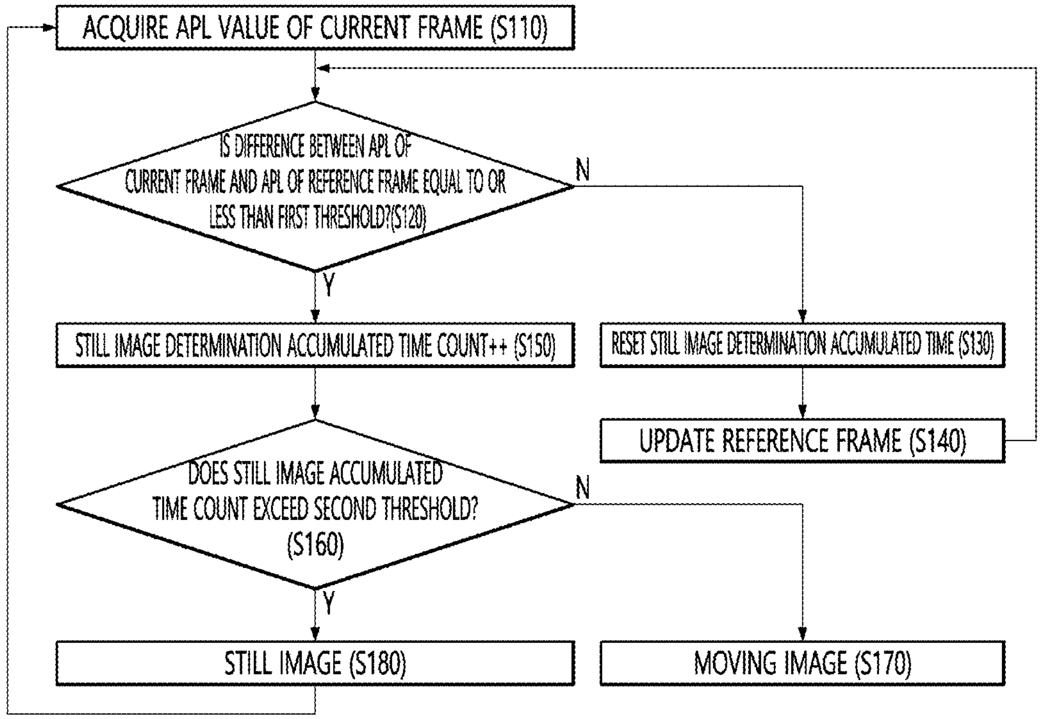
FIG. 9 is a flow chart illustrating the operation method in the still image determination part of FIG. 7.

FIG. 9 is a flow chart illustrating the operation method in the still image determination part of FIG. 7.

FIG. 10 is a diagram illustrating an example of calculating APL values according to an input frame according to an embodiment of the present disclosure.

Figure 11:
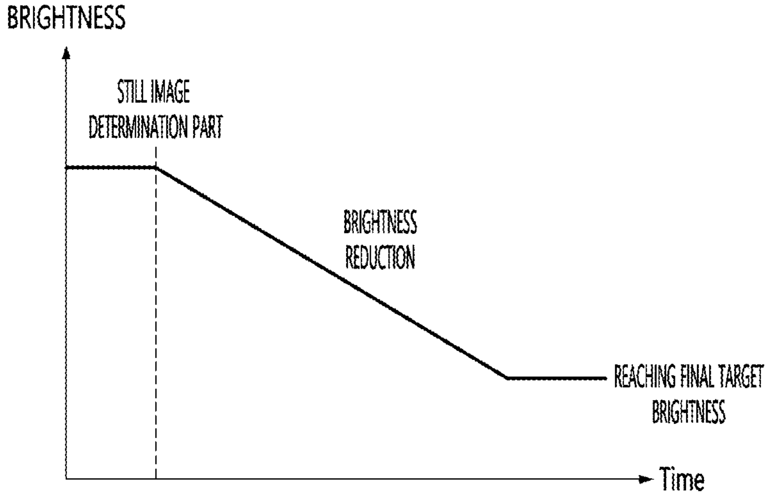
FIG. 11 is a view illustrating a brightness reduction operation when determining the image as a still image according to an embodiment of the present disclosure.

FIG. 11 is a view illustrating a brightness reduction operation when determining the image as a still image according to an embodiment of the present disclosure.

Referring to FIG. 7, a brightness reduction operation control configuration according to an embodiment of the present disclosure may be configured to include at least one of an image acquisition part 710, an input APL detection part 720, a still image determination part 730, a brightness reduction control part 740, and the like.

Although not illustrated in FIG. 7, at least one buffer (not illustrated) for temporarily storing the acquired image may be further included.

The brightness reduction operation control configuration of FIG. 7 may be, for example, the controller 170 of FIG. 1 or a part thereof. However, it is not limited thereto, and may be a separate configuration constituting the display device 100.

The image acquisition part 710 of FIG. 7 corresponds to any one of the broadcast receiving part 130, external device interface part 135, storage part 140, and wireless communication interface part 173 illustrated in FIG. 1, or can acquire image data from them.

The input APL detection part 720 can detect the APL of input image data, that is, an image frame.

At this time, the input APL detection part 720 can use the image, that is, the input data, as is, to which 2.2 gamma is not applied, as in FIG. 8(*a*), so that the APL value is not output small in a dark image due to the application of 2.2 gamma, as in FIG. 6(*b*) described above.

In other words, in the present disclosure, input data can be used as is, as in FIG. 8(*a*), where the change in APL value at low-gradation is relatively large compared to FIG. 6(*b*).

Therefore, according to the present disclosure, it is possible to calculate a value other than '0' for the APL value at low-gradation. In other words, according to the present disclosure, it is possible to accurately apply a brightness reduction algorithm by distinguishing between cases where there is movement at low-gradation and cases where there is not.

FIG. 8(*b*) is a graph illustrating changes in the input APL value detection location in the same low-gradation image.

It is assumed that FIG. 8(*b*) illustrates the same low-gradation image. Here, the vertical axis can represent the APL value and the horizontal axis can represent the APL value detection position.

Referring to FIG. 8(*b*), it can be seen that there is almost no change in the APL value 810 when 2.2 gamma of FIG. 6(*b*) is applied.

On the other hand, when the input data is used as is, as in FIG. 8(*a*), it can be seen that the change in the APL value (820) is relatively large.

In this way, referring to FIG. 8(*a*) and (*b*), it is easy to detect changes in the APL value even for images of the same gradation (especially, low-gradation), so that it is possible to more accurately determine whether there is movement in the corresponding gradation. This determination ultimately indicates that the problem due to unnecessary brightness reduction can be resolved.

Next, the still image determination part 730 can determine whether or not it is a still image based on the APL value detected by the aforementioned input APL detection part 720.

As described above, the determination of whether or not a still image is present may affect the determination of whether or not to apply a brightness reduction algorithm. For example, if the still image determination part 730 determines that the image is a still image, the brightness reduction algorithm may be controlled to operate.

On the other hand, if the still image determination part 730 determines that the image is not a still image, the brightness reduction algorithm can be controlled not to operate.

In relation to this, the still image determination part 730 compares the current frame and the reference frame, and if the difference in the APL value is smaller (or lower) than a preset threshold, the next frame can also be compared with the reference frame.

By repeating the above process, if it continues for a certain period of time, it can be determined as a still image and the brightness reduction algorithm can be activated, that is, operated.

In the above, persisting for a certain period of time may also indicate that the reference frame does not change for a certain period of time or a certain number of frames.

On the other hand, the still image determination part 730 can compare the current frame and the reference frame and, if the difference in the APL value is greater than (or higher than) a preset threshold, update the reference frame to change it to the current frame.

Therefore, the next frame can be compared with the reference frame, that is, the updated previous frame (the current frame).

In the above, if the reference frame is updated or changed before it is determined that the process of repeating the determination process has continued for a certain period of time, it can be illustrated that the standard for determining a still image is reset.

The process can be repeated for the entire frame (or for dark-gradation or specially set frames) to determine whether it is a still image and whether a brightness reduction algorithm should be applied.

FIG. 9 is an example of a flowchart for a method of determining whether an image is a still image by using the APL value of the image detected by the input APL detection part 720.

Referring to FIGS. 8 and 9, the operation of the still image determination part 730 will be described in more detail as follows.

Referring to FIG. 9, the still image determination part 730 can obtain the APL value of the current frame (S110).

The still image determination part 730 can compare the APL value of the nth frame (where n is a natural number) with the reference frame, that is, determine whether the difference between the APL value of the nth frame and the APL value of the reference frame is equal to or less than a preset first threshold (S120).

The still image determination part 730 can reset the still image determination accumulated time accumulated (S130) if, as a result of the determination in step S120, the difference between the APL value of the nth frame and the APL value of the reference frame is not equal to or less than the first threshold.

The still image determination part 730 can update the reference frame (S140) along with resetting the still image determination accumulated time accumulated in step S130.

At this time, the reference frame to be updated (or changed) can be the nth frame.

When the reference frame is updated, the still image determination part 730 can compare the frame starting from the n+1th frame (i.e., the next frame) with the updated reference frame.

On the other hand, if the difference between the APL value of the nth frame and the APL value of the reference frame is equal to or less than the first threshold as a result of the determination in step S120, the still image determination part 730 can increase the count value of the still image determination accumulated time (S150).

After step S150, the still image determination part 730 can determine whether the increased still image determination accumulated time count value exceeds the second threshold (S160).

The still image determination part 730 can determine that the increased still image determination accumulated time count value does not exceed the second threshold as a result of the determination in step S160, and thus determine that the image is a moving image (S170).

On the other hand, if the still image determination part 730 determines that the increased still image determination accumulated time count value exceeds the second threshold as a result of the determination in step S160, it can determine that it is a still image (S180). Then, the above process can be repeated for the next frame (n+1th frame).

FIGS. 10*a* and 10*b* illustrate examples of applying a brightness reduction determination algorithm on a frame-by-frame basis according to one embodiment of the present disclosure.

For example, FIGS. 10*a* and 10*b* specifically apply the method of FIG. 9.

In FIGS. 10*a* and 10*b*, the first column represents a frame number, the second column represents an APL value of each frame, the third column represents a difference between an APL value of a current frame and a reference frame according to a conventional method, the fourth column represents a first threshold APL_Thr, the fifth column represents an APL value of a reference frame, the sixth column represents a difference between a current frame and an updated reference frame according to the present disclosure, the seventeenth column represents whether a final brightness reduction determination has been made, and the last column represents whether brightness reduction has been entered/not entered according to the final brightness reduction determination result in the seventh column.

Referring to FIGS. 10*a* and 10*b*, in a low-gradation image, although APL changes, it increases to a value smaller than the first threshold APL_Thr, and if the value of Δcurrent frame APL−reference frame APL≤the first threshold APL-_Thr persists, brightness reduction occurs even if the APL value changes significantly.

To prevent this, an algorithm can be used to update the reference frame only when the current frame APL value−reference frame APL value>the first threshold APL_Thr, thereby creating a condition in which brightness reduction cannot be performed, such as frames 8, 22, 23, and 26 of FIGS. 10*a* and 10*b*.

As illustrated in FIGS. 10*a* and 10*b*, if only the APL value of the previous frame and the APL value of the current frame are compared, there is a concern that a brightness reduction algorithm may be applied to an image with a relatively dark-gradation by continuously determining it as a still image, which may cause viewing disturbance or discomfort to the user.

On the other hand, as illustrated on the right side of FIGS. 10*a* and 10*b*, by comparing the current frame APL value with the APL value of the reference frame rather than comparing it with the APL value of the previous frame using the reference frame, it is possible to more accurately determine whether it is a still image even in dark-gradation, thereby minimizing viewing discomfort or disturbance due to unnecessary brightness reduction.

Taking frame 30 in FIGS. 10*a* and 10*b* as an example, the explanation is as follows. **

The APL value of the current frame (the 30th frame) is ‘19’. At this time, the APL value of the previous frame (the 29th frame) is also ‘19’, so the difference between the two is ‘0’, and it can be determined as a still image.

On the other hand, since the APL value of the reference frame is ‘14’ in the above, the difference between the two is ‘5’ which is greater than the first threshold APL_Thr of ‘3’, so it cannot be determined as a still image.

In this case, the still image determination time is reset in the 31st frame, and the APL value of the 31st frame can be set as the reference frame.

In FIG. 10*b*, the 31st frame is used as the reference frame, but it is not limited thereto.

In other words, in the present disclosure, the 30th frame may be set as the reference frame.

If it is determined to be a final still image, the brightness reduction control part 740 gradually reduces the brightness of the entire screen over a set period of time, as illustrated in FIG. 11.

The brightness reduction control part 740 can control the brightness to be reduced linearly at a predetermined slope until the target brightness is reached when the brightness reduction algorithm is applied.

According to one embodiment, when determining whether the image is a still image, the still image determination part 730 may increase n by '1', that is, without comparing all frames with the reference frame, and may randomly set the increase in n.

According to one embodiment, when determining whether a still image is a still image, the still image determination part 730 may increase n by '1', that is, instead of comparing all frames with the reference frame, set the increment of n to a value other than '1'. In this case, all frames may not be compared with the reference frame. For example, if the increment of n is set to '2', every other frame may be compared with the reference frame.

According to one embodiment, when determining whether the image is a still image, the still image determination part 730 may increase n by '1', that is, instead of comparing all frames with the reference frame, set the increase in n differently or randomly each time based on the result of comparing each frame.

According to one embodiment, when determining whether the image is a still image, the still image determination part 730 may increase n by '1', that is, without comparing all frames with the reference frame, and may randomly set the increase in n according to the still image accumulated time count.

For example, if the still image accumulated time count continues to increase, there is a high possibility that the next frame will also be a still image, so the increment for n can be set larger.

If the still image accumulated time count is reset at a frame corresponding to the increase of n set larger than the above, the position (frame) where it is first reset can be found by setting n in reverse to a value smaller than the above increase in that frame.

Meanwhile, according to one embodiment, when determining whether the image is a still image, the increase in n may be determined by referring to the update time of the reference frame.

If the reference frame update is relatively recent, the increment of n can be set small, otherwise it can be set large.

Alternatively, conversely, if the reference frame update is relatively recent, the probability of re-update may be low, so the increase in n can be set large and then gradually decreased.

Meanwhile, according to one embodiment, when determining whether the image is a still image, the still image determination part 730 may randomly set the increase in n based on the scene change point in time, the object change point in time, or the like.

Figure 12:
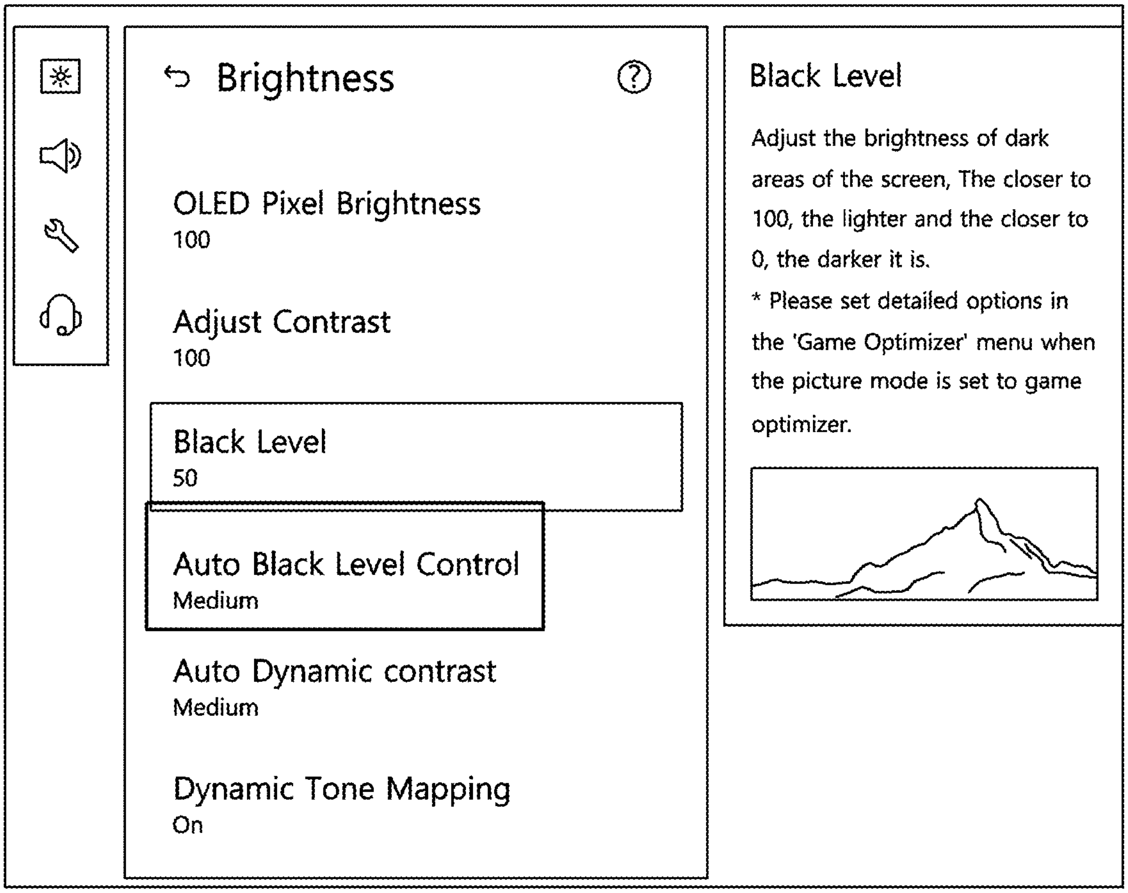
FIG. 12 illustrates an example of a user interface provided in relation to automatic black level adjustment according to input APL according to one embodiment of the present disclosure.

FIG. 12 illustrates an example of a user interface provided in relation to automatic black level adjustment according to input APL according to one embodiment of the present disclosure.

Referring to FIG. 12, an additional use of the APL value detection method can be made to implement a function of automatically adjusting the black level of the screen in an image where a dark image continues to appear, thereby making a person appear clearer.

FIGS. 13(*a*) and 13(*b*) are drawings illustrating a brightness processing method according to an input APL value according to an embodiment of the present disclosure.

FIG. 13(*a*) relates to a conventional technology, in which case, it is possible to measure brightness to determine whether the screen becomes dark by playing an HDR image in which all APL values are '0'. In this case, the screen can be controlled so as not to become dark.

According to an embodiment of the present disclosure, FIG. 13(*b*) is a case of a moving image in which the screen becomes dark after the algorithm is operated in a still image with an APL value of '0', and the difference between the APL values of the current frame and the reference frame is maintained to be less than '1', but the APL value gradually increases, and it can be confirmed whether the brightness has brightened, that is, it can be seen that the screen brightness is restored.

According to at least one of the various embodiments of the present disclosure described above, there is an expected effect of solving the user's viewing inconvenience by preventing the screen from darkening during moving image playback, since there is a problem in which the APL value difference does not occur in a dark-gradation image even though it is not a still image in an algorithm for reducing brightness in an existing still image, and the image is recognized as a still image.

In addition, by changing the calculation method of the APL value, the existing still image brightness reduction algorithm does not operate on already dark screens in low-gradation, and the brightness reduction algorithm operates on images that require screen brightness reduction to reduce afterimages on OLED panels, thereby lowering the risk of afterimages and preventing operation on already dark images, thereby resolving user inconvenience.

Unless specifically stated otherwise, the figures mentioned in this disclosure are only examples and are not limited thereto. In addition, the order of at least some of the operations disclosed in this disclosure may be performed simultaneously, in a different order than the order described above, or some may be omitted/added.

According to one embodiment of the present disclosure, the above-described method can be implemented as a processor-readable code on a medium in which a program is recorded. Examples of the processor-readable medium include a ROM, a RAM, a CD-ROM, a magnetic tape, a floppy disk, an optical data storage device, and the like.

The display device described above is not limited to the configuration and method of the embodiments described above, but the embodiments may be configured by selectively combining all or a part of the embodiments so that various modifications can be made.

What is claimed is:

1. A display device comprising:

a display configured to display input images; and a processor configured to apply a brightness reduction algorithm to the input images, wherein the processor is configured to:

obtain an Average Picture Level (APL) value of a current frame of the input images;

obtain a difference between the APL value of the current frame and an APL value of a set reference frame;

apply the brightness reduction algorithm to the current frame based on the difference being greater than a first threshold;

updating the reference frame to the current frame based on the difference being greater than a first threshold;

maintaining the reference frame as the set reference frame based on the difference being less than or equal to the first threshold; and cause the display to display the current frame having the brightness reduction algorithm applied.

2. The display device of claim 1, wherein the processor is configured to maintain the reference frame for comparison with an APL value of a next frame after the current frame based on the difference between the APL value of the current frame and the APL value of the set reference frame being less than or equal to the first threshold.

3. The display device of claim 2, wherein the processor is configured to set the current frame as the reference frame for comparison with an APL value of a next frame after the current frame based on the difference between the APL value of the current frame and the APL value of the reference frame being greater than the first threshold.

4. The display device of claim 3, wherein the processor is configured to increase a still image determination time count based on the difference between the APL value of the current frame and the APL value of the set reference frame being less than or equal to the first threshold.

5. The display device of claim 4, wherein the processor is configured to determine whether the still image determination time count exceeds a second threshold after the still image determination time count is increased.

6. The display device of claim 5, wherein the processor is configured to determine that the current frame corresponds to a still image based on a determination that the still image determination time count exceeds the second threshold.

7. The display device of claim 6, wherein the processor is configured to apply the brightness reduction algorithm to the current frame based on a determination that the current frame corresponds to a still image.

8. The display device of claim 7, wherein applying the brightness reduction algorithm comprises linearly reducing brightness of the current frame at a predetermined slope until a target brightness is reached.

9. The display device of claim 6, wherein the processor is configured to determine that the current frame corresponds to a moving image based on a determination that the still image determination time count does not exceed the second threshold.

10. The display device of claim 9, wherein the processor is configured to not to apply the brightness reduction algorithm to the current frame based on a determination that the current frame corresponds to a moving image.

11. The display device of claim 9, wherein after a determination that the current frame corresponds to a still image or a moving image, the processor is configured to calculate a difference between an APL value of a next frame and the APL value of the current frame set as the reference frame to determine whether to apply the brightness reduction algorithm to the next frame.

12. The display device of claim 3, wherein the processor is configured to reset a still image determination time count based on setting the current frame as the reference frame.

13. The display device of claim 12, wherein the processor is configured to determine whether the current frame corresponds to a still image by comparing the APL value of the current frame set as the reference frame and the APL value of the next frame after the current frame.

14. The display device of claim 1, wherein the processor is configured to determine that the current frame corresponds to a still image based on the reference frame not having been changed for at least a predetermined period of time or for at least a predetermined number of frames.

* * * * *